(12) United States Patent
Wang et al.

(10) Patent No.: US 7,562,354 B2
(45) Date of Patent: Jul. 14, 2009

(54) ARCHITECTURE AND METHOD OF A CELLULAR PHONE EMBEDDED SYSTEM

(75) Inventors: Chung-Chuan Wang, Taipei (TW); Chun-Ta Huang, Taipei (TW)

(73) Assignee: Winity Technology, Inc., Taipei (TW)

( * ) Notice: Subject to any disclaimer, the term of this patent is extended or adjusted under 35 U.S.C. 154(b) by 925 days.

(21) Appl. No.: 11/179,005

(22) Filed: Jun. 27, 2005

(65) Prior Publication Data

US 2006/0015838 A1    Jan. 19, 2006

(51) Int. Cl.
G06F 9/44    (2006.01)
G06F 9/45    (2006.01)
G06F 15/16    (2006.01)

(52) U.S. Cl. .................. 717/140; 717/136; 717/109; 717/118; 717/101; 709/219

(58) Field of Classification Search .............. 717/140, 717/136, 109, 118, 101; 709/219; 713/324
See application file for complete search history.

(56) References Cited

U.S. PATENT DOCUMENTS

| | | | |
|---|---|---|---|
| 6,611,921 B2* | 8/2003 | Casebolt et al. | 713/324 |
| 2002/0184610 A1* | 12/2002 | Chong et al. | 717/109 |
| 2003/0110239 A1* | 6/2003 | Sugumoto et al. | 709/219 |
| 2004/0230950 A1* | 11/2004 | Bedner et al. | 717/118 |
| 2005/0155012 A1* | 7/2005 | Tayama et al. | 717/101 |

OTHER PUBLICATIONS

Delaluz, et al. "Compiler-Directed Array Interleaving for Reducing Energy in Multi-Bank Memories", 2002, IEEE, p. 1-6.*
Pillai, et al. "Real-Time Dynamic Voltage Scaling for Low-Power Embedded Operating Systems", 2001, ACM, p. 89-102.*

* cited by examiner

*Primary Examiner*—Wei Y Zhen
*Assistant Examiner*—Qamrun Nahar
(74) *Attorney, Agent, or Firm*—Troxell Law Office, PLLC

(57) ABSTRACT

A new architecture and method of a cellular phone embedded system consists of an application system interface sector and an execution system interface sector. The application system interface sector includes an application program executed on a cellular phone platform system, and a conversion to a PIFF format is performed by a program compiling software and an MVM application program code. The converted PIFF format is downloaded to the execution system interface sector, so as to enable an internal OS management system to be an open system program sector. The execution system interface sector contains an MVM subsystem, and the converted PIFF format is linked to an MVM system program code (ORGAN.lib) by an MVM internal system program operating platform and the application system interface sector. Moreover, an active fast dynamic address linking and static address linking is used to constitute a new architecture of system platform.

2 Claims, 3 Drawing Sheets

ARCHITECTURE AND METHOD OF A CELLULAR PHONE EMBEDDED SYSTEM

BACKGROUND OF THE INVENTION (a) Field of the Invention

The present invention relates to a new architecture and method of a cellular phone embedded system, and more particularly to a new architecture and method whereby a closed system program sector for an original architecture can be a new open system program sector due to a combination with an MVM (Matrix-Vector Multiplication) subsystem.

(b) Description of the Prior Art

For conventional embedded system architecture, single closed system architecture is usually formed by linking a system software, an application software, an operating system, and other software modules. Therefore, for the conventional embedded system architecture, programs are executed inside the architecture, thereby being unable to flexibly increase efficiency in system utilization. Moreover, for the conventional embedded system architecture, addresses of instructions to be executed are all passively and statically linked, disregarding sizes of programs. Therefore, functions of an open system cannot be achieved by the conventional embedded system architecture.

Accordingly, how to provide an open system program sector and a new method of active fast dynamic address linking is a motivation of invention of the present inventor.

SUMMARY OF THE INVENTION

The present invention is to provide a new architecture and method of a cellular phone embedded system whereby a closed system program sector for an original architecture can be a new open system program sector due to a combination with an MVM subsystem.

The new architecture and method of the cellular phone embedded system can also be applied to different embedded systems, thereby increasing efficiency in system utilization.

In addition, the new architecture and method of the cellular phone embedded system can also provide an application in partitioning system software modules, and convert instructions Whose addresses are statically linked into the instructions whose addresses are actively, quickly, and dynamically linked, so as to increase efficiency in utilization of an embedded mobile device, without affecting a cost of an entire system memory interface system.

To enable a further understanding of the said objectives and the technological methods of the invention herein, the brief description of the drawings below is followed by the detailed description of the preferred embodiments.

DETAILED DESCRIPTION OF THE PREFERRED EMBODIMENTS

Figure 1:
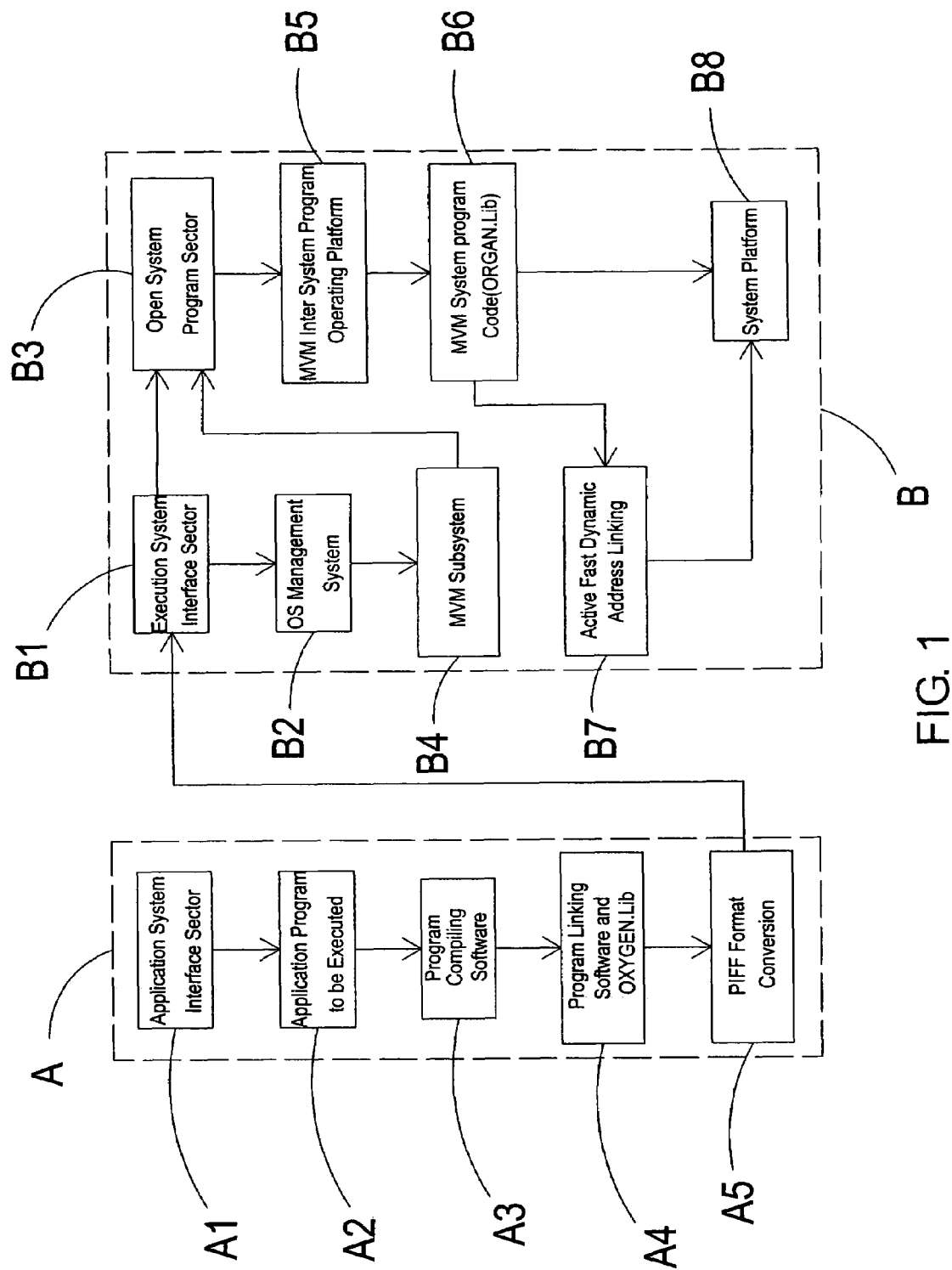
FIG. 1 shows a system block diagram of the present invention.

Referring to FIG. 1, an application system interface sector A1 contains an application program A2 to be executed on a cellular phone platform system, and a conversion to a PIFF (Portable Image File Format) format A5 is performed by a program compiling software A3, an MVM program linking software, and the OXYGEN.lib A4. The converted PIFF format A5 is downloaded to an execution system interface sector B1, so as to enable an interior OS (Operating System) management system B2 to be an open system program sector B3, and to upgrade to a cellular phone virtual memory system of a portable mobile device B.

The execution system interface sector B1 contains an MVM subsystem B4, and the converted PIFF format A5 is linked to an MVM system program code (ORGAN.LIB) B6 by an MVM internal system program operating platform B5 and the application system interface sector A1. Next, the converted PIFF format A5 is linked to a system platform B8 with a method of active fast dynamic address linking B7, thereby constituting the cellular phone virtual memory system B with a high efficiency and a low cost.

Figure 2:
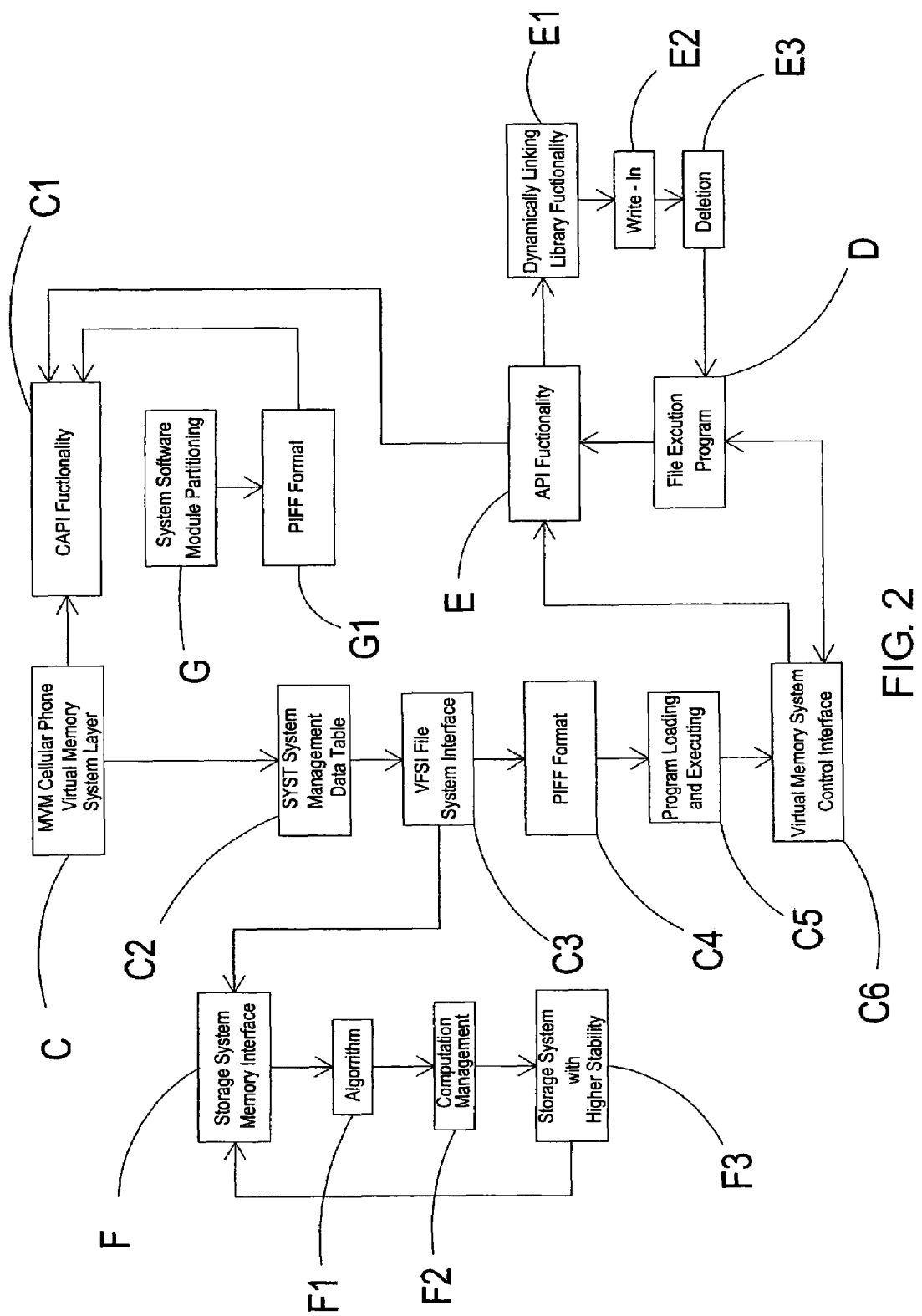
FIG. 2 shows another system block diagram of the present invention.

Referring to FIG. 2, an embedded mobile device contains an MVM cellular phone virtual memory system layer C which includes an executable CAPI (custom API services, DLL feature libraries) functionality C1, a SYST (virtual memory system table) system management data table C2, a VFSI (Virtual File System Interface) file system interface C3, and a PIFF format C4. For all the executable MVM cellular phone virtual memory system layers C, a program loading and executing C5 should be performed with the PIFF format C4, and programs which should be executed are controlled and managed by a virtual memory system control interface C6.

For application in system software module partitioning G, a conversion to a PIFF format G1 is loaded into the CAPI functionality C1. For the cellular phone virtual memory system B, a file execution program D outputted from executing a program, and an API (Application Program Interface) functionality E can all be the functions of CAPI C1. Moreover, the CAPI C1 has the same functions as those of a dynamically linking library E1; therefore, a write-in E2, and a deletion E3 can be provided, which can be shared between the file execution program D and the API functionality E.

The VFSI file system interface C3 can be used to access file data inside a NAND flash memory and to access a storage system memory interface F, such that an algorithm of its interior file system F1 can be used to compute and manage a relationship between bad blocks and a physical architecture of semi-conductor F2, thereby providing a storage system with a higher stability F3.

Figure 3:
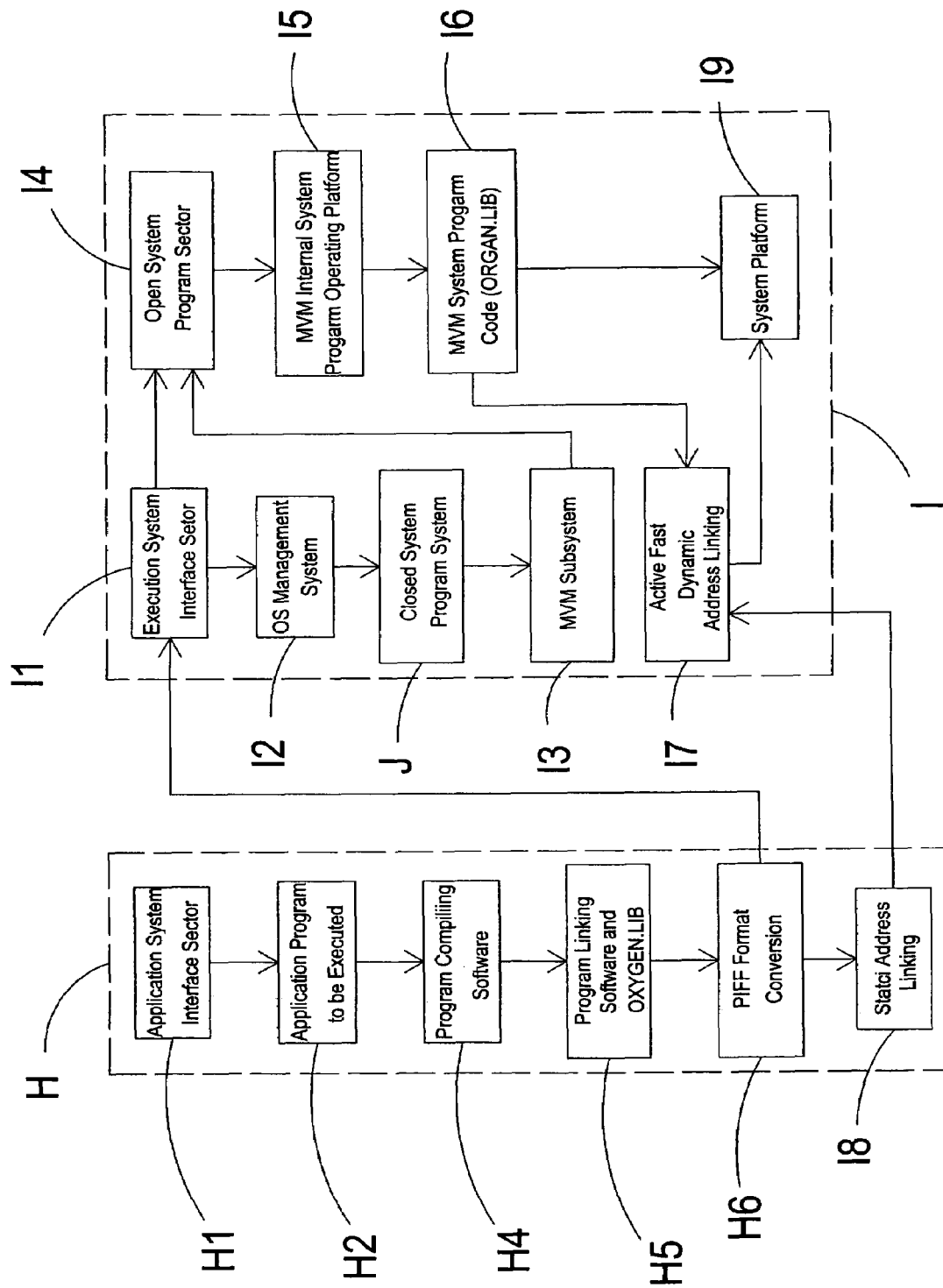
FIG. 3 shows a schematic view of an implementation of the present invention.

Referring to FIG. 2 and FIG. 3, an application system interface sector H1 contains an application program H2 to be executed on a cellular phone platform system, and a conversion to a PIFF format H6 is performed by a program compiling software H3, an MVM program linking software, and the OXYGEN.lib H4. The converted PIFF format H6 is downloaded to an execution system interface sector I1, so as to enable an interior OS management system I2 to be an open system program sector I3 by combining with an MVM subsystem I4, thereby facilitating an upgrade to a cellular phone virtual memory system of a portable mobile device I.

The execution system interface sector I1 contains an MVM subsystem I4, and the converted PIFF format H6 is linked to an MVM system program code (ORGAN.LIB) I6 by an MVM internal system program operating platform I5 and the application system interface sector H1. Finally, a new method of active fast dynamic address linking I7 and static address linking I8, is used to constitute a new architecture of system platform I9, thereby constructing the cellular phone virtual memory system I with a high efficiency and a low cost.

Other than accessing the PIFF format C4, the VFSI file system interface C3 in the new architecture can be further implemented as a VDWW (Virtual Device World Wide), which not only includes a virtual storage device through the internet, but also can be implemented as a virtual computing device through the internet.

Furthermore, the present invention can be used to combine with embedded microprocessor instruction architecture through new types of compiling software compatible with the MVM system, thereby fully increasing system efficiency.

The characteristics of the present invention lies in that a closed system program sector J can be a new open system program sector I3 by a means of MVM subsystem I4.

The present invention can be also applied to different embedded mobile devices, thereby increasing their system efficiencies.

To further manifest the advancement and practicability of the present invention, the advantages of the present invention are listed below:

(1) It can increase system functions of an embedded mobile device.

(2) It can be applied to partitioning system software modules.

(3) It is provided with CAPI functionality.

(4) It is provided with a new method of active fast dynamic address linking and static address linking.

(5) The OXYGEN.lib and the ORGAN.lib are system software components in small sizes, and are very easily to be integrated into an embedded system.

(6) It has an industrial competitiveness.

(7) It has a value of commercial application.

(8) It is new and original.

It is of course to be understood that the embodiments described herein is merely illustrative of the principles of the invention and that a wide variety of modifications thereto may be effected by persons skilled in the art without departing from the spirit and scope of the invention as set forth in the following claims.

What is claimed is:

1. A new architecture and method of a cellular phone embedded system comprising a flash memory, an application system sector and an execution system interface sector, whereby a closed system program sector for an original architecture can be a new open system program sector by a means of an Matrix-Vector Multiplication (MVM) subsystem; the new architecture and method of the embedded system being applied to different embedded systems for increasing their efficiencies; the application system sector containing an application program to be executed on a cellular phone platform system, and a conversion to a Portable Image File Format (PIFF) format being performed by a program compiling software, an MVM program linking software, and an OXYGEN.lib; the converted PIFF format being downloaded to the execution system interface sector, enabling an interior Operating System (OS) management system to be an open system program sector by combining with the MVM subsystem, thereby facilitating an increase of system functions of an embedded mobile device; the execution system interface sector containing the MVM subsystem, and the converted PIFF format being linked to an MVM system program code (ORGAN.LIB) by an MVM internal system program operating platform and the application system sector, constituting a new architecture of system platform by a new method of active fast dynamic address linking and static address linking, thereby constructing a cellular phone virtual memory system with a high efficiency and a low cost; a conversion to a PIFF format being loaded into Custom API Services (CAPI) functionality for application in system software module partitioning; the CAPI having a same functions as those of a dynamically linking library; a set of scoring mechanism and computation management being setup by a bad blocks management algorithm inside a Virtual File System Interface (VFSI) using a distance between a semi-conductor physical architecture of a NAND flash memory and the bad blocks, thereby achieving a higher system stability.

2. The new architecture and method of a cellular phone embedded system according to claim 1, wherein the application interface the execution system interface sector can be further applied to a desktop computer, a personal laptop computer, a portable mobile system, a personal digital assistant, a video transmission system, and a related memory interface system containing a memory system architecture.

* * * * *